Dec. 8, 1925.

A. WILSON 1,564,301

CURTAIN RING AND CLIP FOR SUSPENDING CURTAINS AND THE LIKE

Filed Dec. 11, 1924

Inventor:
Archibald Wilson,
by Langner, Parry, Card & Langner
Att'ys.

Patented Dec. 8, 1925.

1,564,301

UNITED STATES PATENT OFFICE.

ARCHIBALD WILSON, OF PIETERMARITZBURG, NATAL, SOUTH AFRICA.

CURTAIN RING AND CLIP FOR SUSPENDING CURTAINS AND THE LIKE.

Application filed December 11, 1924. Serial No. 755,327.

*To all whom it may concern:*

Be it known that I, ARCHIBALD WILSON, a subject of the King of Great Britain, and resident of Pietermaritzburg, in the Natal Province of the Union of South Africa, farmer, have invented certain new and useful improved Curtain Rings and Clips for Suspending Curtains and the like, of which the following is a specification.

This invention relates to a curtain ring and clip for suspending curtains and the like and has for its object a method of fastening and suspending a curtain or other like object on a rod or pole in a ring and clip all in one piece which will be more simple than the old method of a separate ring and pin or hook and will not damage or perforate the curtain or other fabric so suspended.

In order that my invention may be readily understood and carried into practice, reference is hereby made to the accompanying sheet of illustrative drawings which shew an example of my invention and wherein:—

Referring to the drawings wherein like letters of reference indicate the same or corresponding parts wherever occurring throughout the figures, A designates a piece of spring steel or other hard and pliable material of convenient length and width to suit particular requirements.

Figure 1:
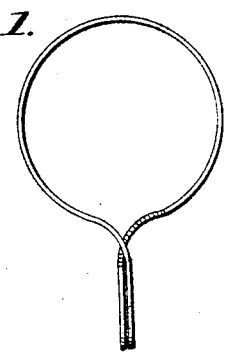
Fig. 1 is an elevational view of an example of a combined ring and clip constructed in accordance with a preferred embodiment of my invention, the clip being in its closed position.
Figure 2:
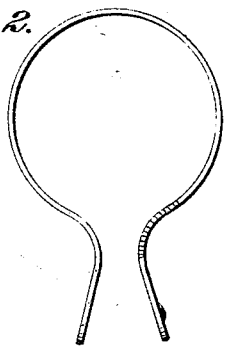
Fig. 2 is an elevational view of the same example in its open position.
Figure 3:
Figs. 3 and 4 are plan views of Figs. 1 and 2 respectively.
Figure 4:
Figure 5:
Fig. 5 is a side elevational view of Fig. 1.
Figure 6:
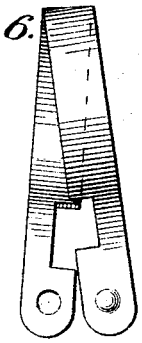
Fig. 6 is a side elevational view of the ring and clip in its open position shewing the ends of the spring passing one another, and Figs. 7 and 8 shew on an enlarged scale sectional views of the lower part of the ring and clip in a reversed closed and open position respectively.
Figure 7:
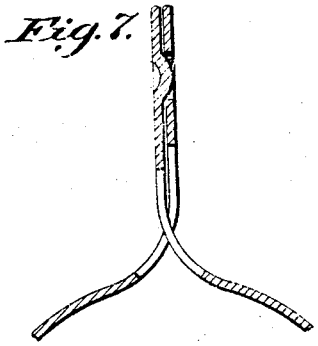
Figure 8:
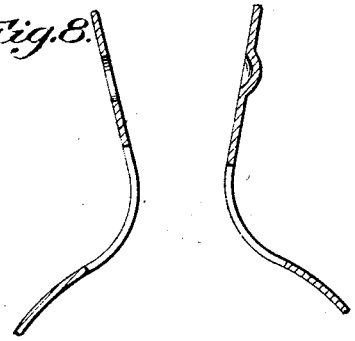

Cut away portions or slots B, B¹ are formed at suitable points in the length of the springy material and on opposite sides thereof in such a manner that upon the central portion of the spring steel or the like being formed into a ring C, the one cut away portion or slot will fit into the other.

The action referred to in the last preceding paragraph also forms a clip of the end portions of the spring steel or the like beyond the said cut away portions which end portions are so shaped in relation to one another and the ring proper that they normally make a neat fit when in their closed position.

The one surface of the clip may if convenient or desirable be provided by stamping or otherwise with a boss D on the inside and the other surface with a hole or recess E to receive the boss for the purpose of adding to the retaining power of the clip when in action.

The improvements herein set forth are not limited to the precise construction and arrangement shewn and described, for they may be embodied in various forms and modifications without departing from the spirit and scope of the invention.

Having now particularly described and ascertained the nature of my said invention and in what manner the same is to be performed, I declare that what I claim is:—

A combined curtain ring and clip, comprising, a strip of spring metal formed in a ring with its ends projecting radially from the ring, opposed matching rectangular notches in the edges of the strip near its ends, a button integrally stamped in the strip at one end, a button receiving socket in the other end of the strip, the button and socket interengaging and being held in place by the spring of the strip after the notched portions have been interengaged.

In testimony whereof I affix my name at Durban, in the Natal Province of the Union of South Africa, this 24th day of October, 1924.

ARCHIBALD WILSON.